April 16, 1940.  W. MAKENNY ET AL  2,197,528
MOLDING PRESS
Filed Jan. 18, 1934    5 Sheets-Sheet 3
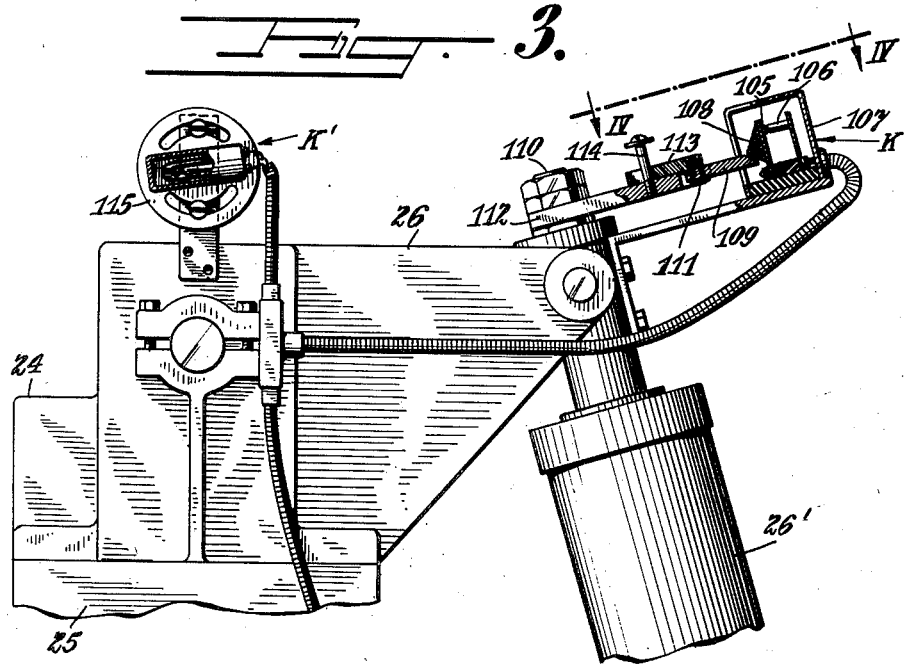
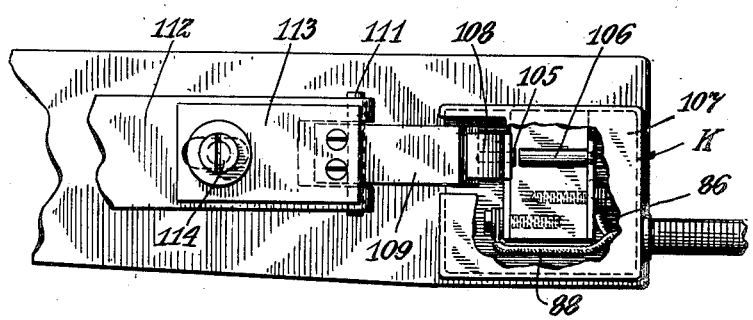
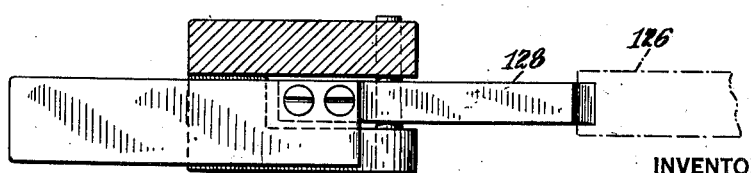
INVENTOR
W. MAKENNY
W. HARRISON
BY
ATTORNEY

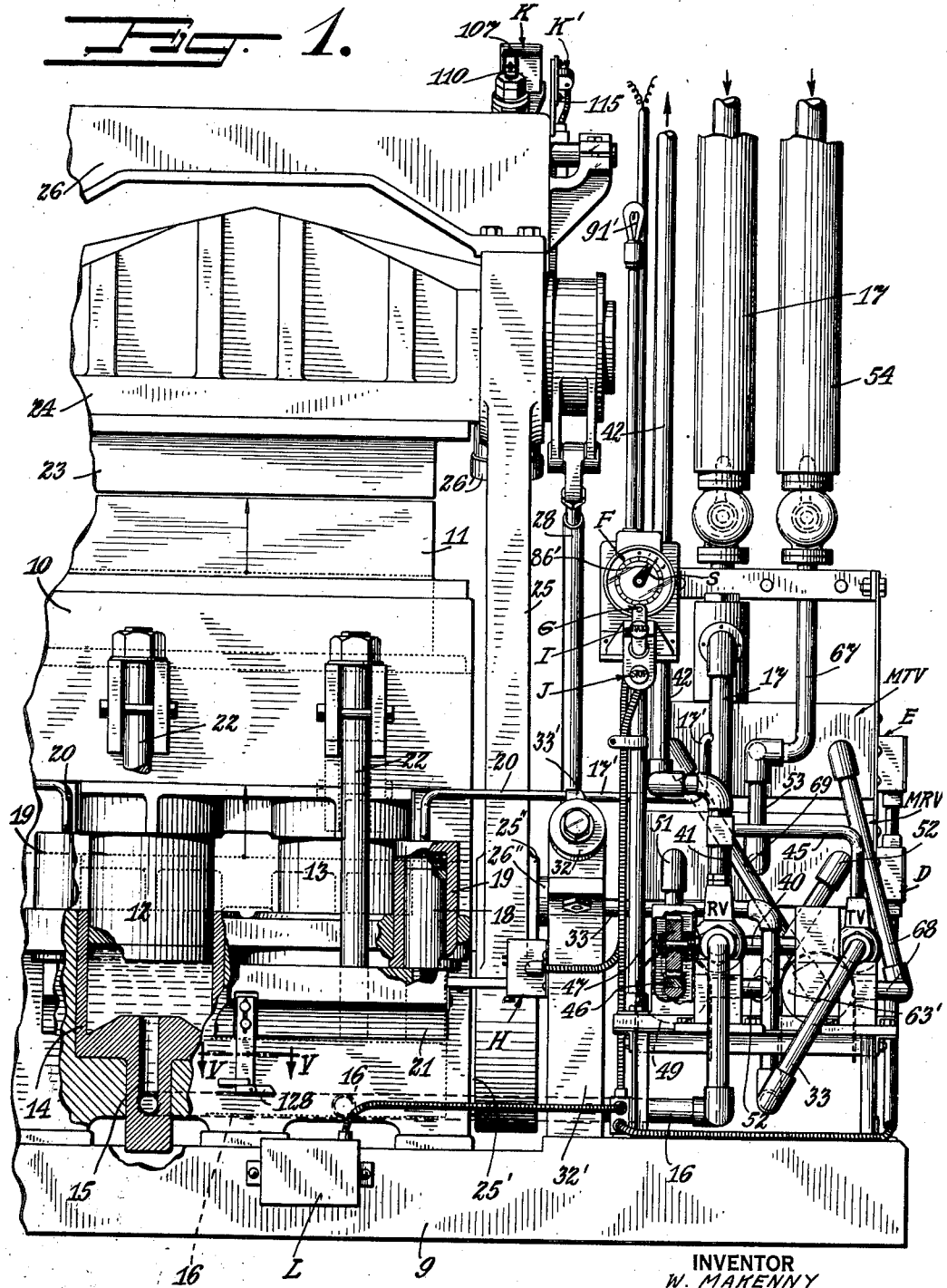

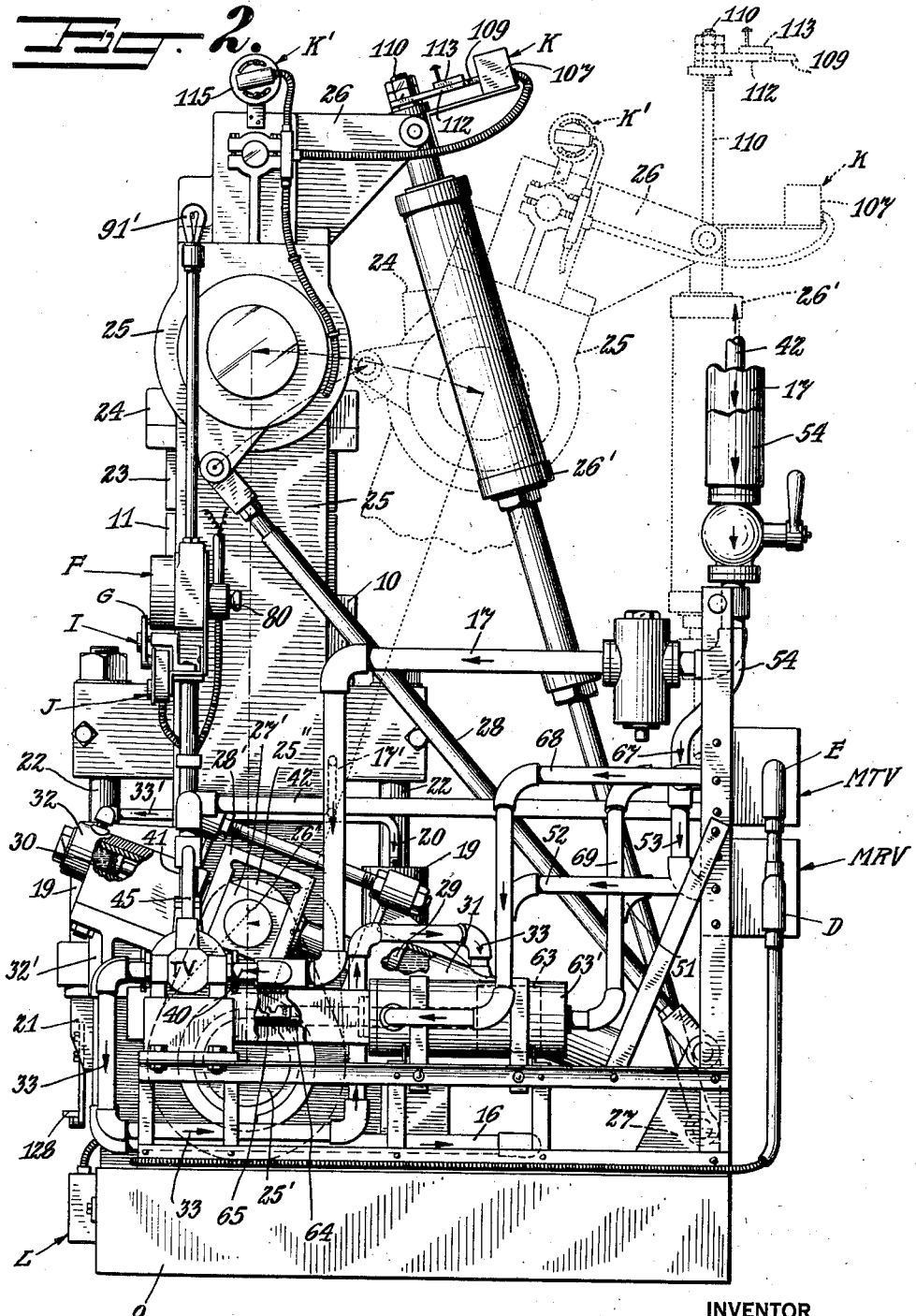

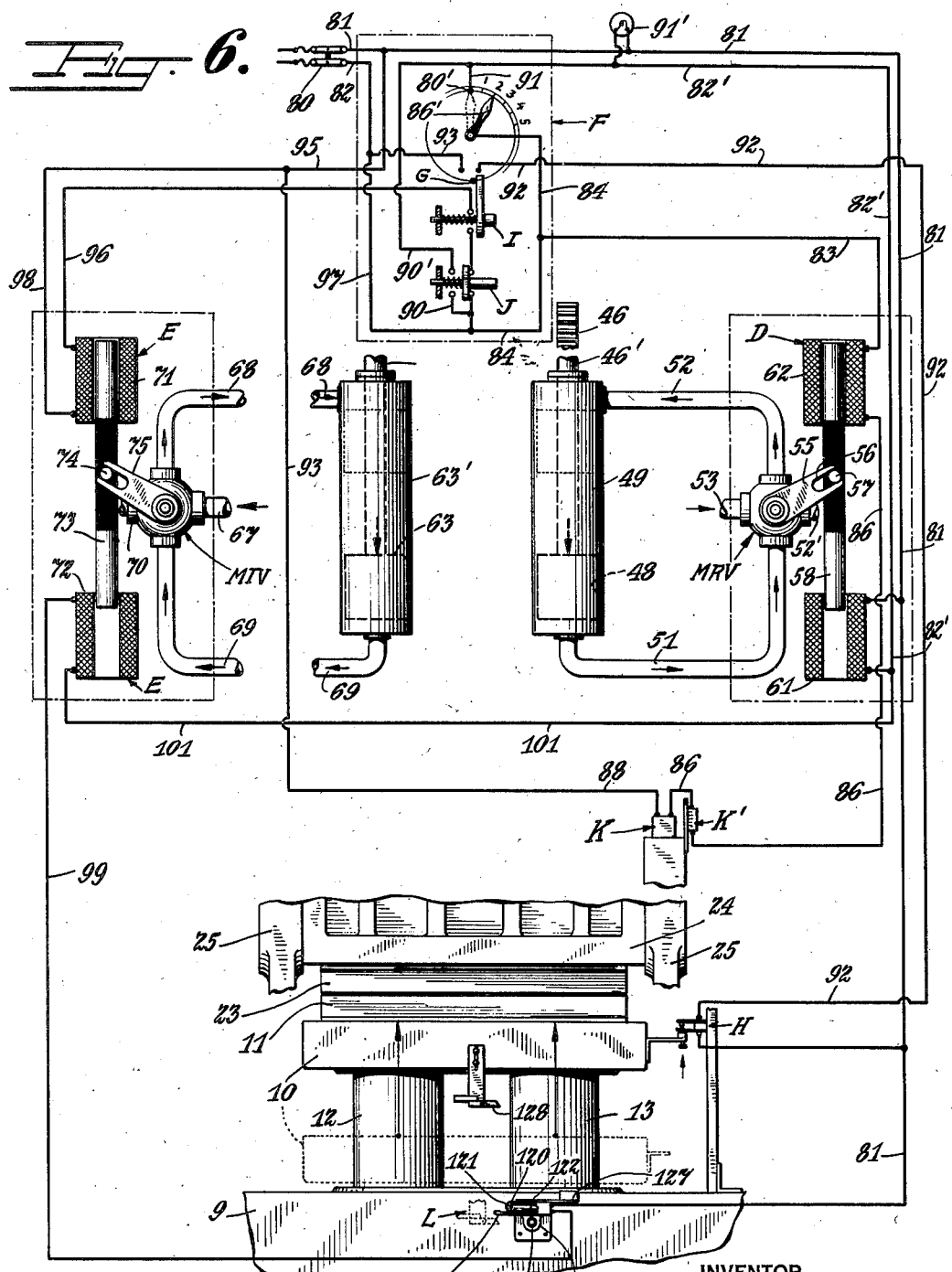

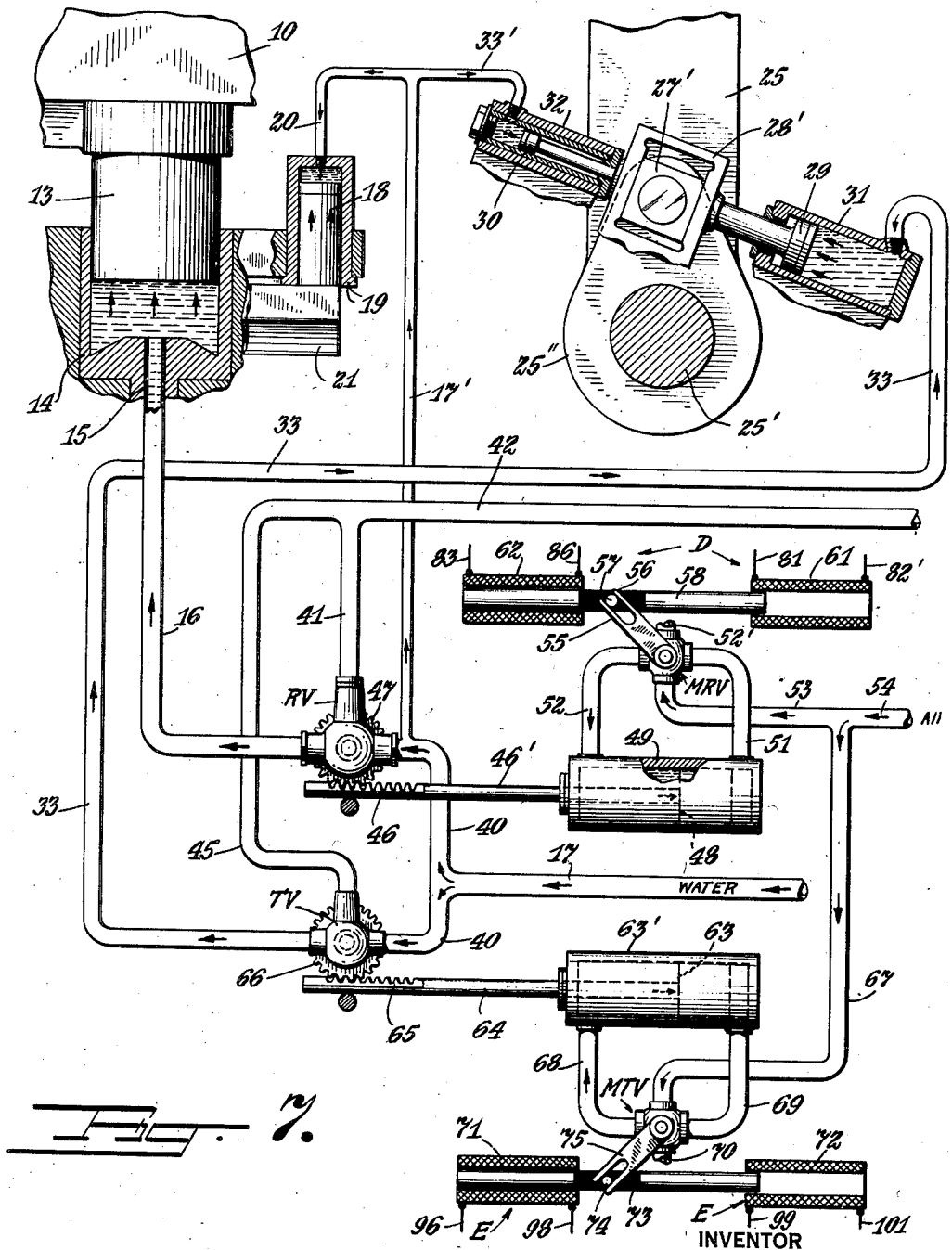

Patented Apr. 16, 1940

2,197,528

UNITED STATES PATENT OFFICE 2,197,528

MOLDING PRESS

William Makenny, Mountain View, and William Harrison, Bloomfield, N. J., assignors, by mesne assignments, to Westinghouse Electric and Manufacturing Company, East Pittsburgh, Pa., a corporation of Pennsylvania Application January 18, 1934, Serial No. 707,056

10 Claims. (Cl. 18—17)

This invention relates to molding presses and particularly to various improvements in such having mold parts actuated by hydraulic means to mold plastic material into a desired shape.

In a molding press of the above character it is common to attach one mold part or element, as a cope, in an inverted position to a tilting head of the press and to move the other mold part or drag in molding relation thereto by means of a platen or table operated by a hydraulic ram. A molding press of this character is shown and described in Patent No. 1,405,484 which issued February 7, 1922.

When the pressure on the mold has been effected by a movement of the ram, the ram is reversed and the platen lowered and the upper mold part, carried in the tilting head, is tilted backward to permit access for the removal of the molded parts and the inserting of a new batch of moldable material. It is common in molds of this class to provide manually controlled means whereby the mold parts are actuated by mechanical agency at the termination of each molding operation, heat being furnished from any suitable source.

When articles are molded of certain materials, such for example as "Bakelite" it is desirable to hold the cope and drag of the mold closed for a predetermined time interval to set or cure the moldable material. This makes it necessary for an operator to carefully attend a press and open the mold at the proper time to prevent excessive curing. Usually some means such as a bell or indicator light is caused to function to attract the attention of the operator at the end of a given time period. It may happen, however, that an operator is unable to immediately attend the press to remove the molded articles which may be injured by excessive curing or prolonged heating. Furthermore, under such conditions an operator can only properly attend a relatively small number of presses.

In accordance with the present invention a molding press is provided with cooperating machine elements so controlled and arranged that the press is opened automatically at the end of a given set time period and electrical means in the form of a push button or switch serves to cause the press to close for a molding operation and to open without attention on the part of the attendant at the end of a set time period. The means employed for accomplishing the above includes certain mechanical, electrical and fluid control elements which are operable in a definite order.

When the press is open and loaded for a molding operation, the head carrying the upper mold element is in its angular or tilted position and the lower mold element is in its lower position. Timing mechanism is then set for a predetermined curing or molding period. By means of a switch electrical energy is caused to flow, operating electrical means which in turn operates valves which cause the head to move back to a vertical position ready to receive the bottom mold element. As the tiltable head moves to its final or vertical position, electrical means are actuated to cause a flow of electrical energy which operates valve mechanisms to move the lower mold element to position in molding relation with the top mold element. After the selected time interval has passed the timing mechanism operates to cause a flow of electrical energy actuating means which in turn operates valves which first move the lower mold element downwardly and as this mold element reaches its final position means are actuated to cause electrically operated means to operate valves which cause the head carrying the upper mold element to be tilted. Thus the press is again open and ready to have the molded articles removed and it may then be loaded for another molding operation.

A molding press provided with the operating elements in accordance with the present invention does not require the close attention of an operator as heretofore required and it is possible for one operator to attend a greater number of presses than was heretofore possible. Moreover, since the opening of the press is automatically determined by the molding time the possibility of an operator shortening the curing period to hasten production at the expense of good quality is avoided.

The invention will be more clearly understood by reference to the following description together with the following drawings in which Fig. 1 is a front view of a molding press provided with automatic control mechanism in accordance with the present invention;

Fig. 2 is a side elevational view of the press as shown in Fig. 1;

Fig. 3 is an enlarged detail view of a tilting head carrying means for making or breaking a circuit;

Fig. 4 is a top view of the make-and-break mechanism indicated by line IV—IV in Fig. 3;

Fig. 5 is an enlarged plan view of a switch actuating means taken on line V—V in Fig. 1;

Fig. 6 shows the various electrically operated elements and the electrical circuit therefor; and Fig. 7 shows the various fluid controlled elements in diagrammatic arrangement with connecting fluid conductors.

The selected embodiment of the invention is shown and described as applied to a hydraulic molding press such as employed to mold articles from a phenol condensation product where high temperatures and pressures are important. The press shown in the accompanying drawings is substantially the same as that shown in the patent above mentioned except for certain variations in design. The immediately following description will, therefore, be directed generally to such a press and will continue with a complete description of the present invention as applied thereto.

A press of the above mentioned type may comprise a bed plate 9 which supports the press proper, also certain superstructure for mounting other operating elements.

Briefly, the press shown includes a platen 10 on which is mounted a lower mold element or drag 11 which is lifted by the rams 12 and 13 of hydraulic engines. The rams are disposed in engine cylinders 14 having inlet passages 15 each of which is provided with a pipe 16 leading to one side of a ram-control-valve RV, the opposite side of the valve being connected with a pressure supply pipe 17 through which fluid, as for example, water, is supplied from a suitable pressure source. The valve RV, as will be later described, comprises part of the present invention.

The return or descent of the platen is effected by four pull-back pistons 18 movable under constant pressure in cylinders 19. These pull-back pistons and cylinders are of similar construction and each cylinder is provided with an inlet pipe 20 connected with the pressure line 17 by means of pipe 17' for the passage of fluid into the cylinders between the cylinder heads and the inner ends of the pistons 18.

The pull-back cylinders are arranged in pairs at opposite sides of the platen and a cross-bar 21 is disposed between the cylinders of each pair and connected to the outer ends of the pistons so that the pistons move the cross bar. Extending upwardly from each cross bar are two pull-rods 22 having their lower ends secured to the cross bar and their upper ends secured to yokes integral with the platen so that when the pistons are forced downwardly they move the cross bar 21 and thus cause a downward movement of the platen. The effective area of the rams 12 and 13 is greater than the combined effective area of the pistons 18. Thus the upward movement of the platen is readily effected even though the pistons 18 are subjected to the pressure of the line 17. The pistons operate to lower the platen when the pressure in the rams is released as will be later described.

The upper mold element or cope 23 is secured to a tilting head 24 which is mounted to swing on connecting rods 25. The rods may, as shown in Figs. 2 and 3, be provided with an extension 26 to which is pivotally attached one end of shock-absorbing member 26'. The opposite end of said member is pivotally secured to a boss 27 on the bed-plate 9. A pair of rods 28 serve to turn the face of the top mold element outwardly to make it accessible for cleaning when the head is tilted by a movement of the connecting rods 25. Two connecting rods of similar construction are employed and disposed at opposite ends of the head 24. As shown in Figs. 1 and 2, each connecting rod 25 may be pivoted on a stub shaft 25' and is provided with a crank 25" the free end of which is pivotally connected at 26" to sliding box 27' in a yoke 28'.

Opposite sides of the yoke 28' are connected to the pistons 29 and 30 of two differential hydraulic engines having (see Fig. 2) cylinders 31 and 32 respectively and suitably supported on a bracket 32'. Fluid is admitted to the cylinder 31 by means of a pipe 33 leading from a tilting-head-control valve TV and cylinder 32 receives pressure fluid direct from the pressure line by means of pipe 33'. The actions of the pistons 29 and 30 are opposed to one another and when hydraulic pressure is exerted on the pistons 29 the connecting rods 25 are moved to vertical positions so that the mold element in the head 24 is in position to receive the mold element on the platen 10. When pressure is released from the piston 29 the constant pressure which is applied to the piston 30 serves to tilt the head 24, as shown in dotted lines in Fig. 2. When the larger piston 29 is subjected to pressure, it overcomes the force of the smaller piston to return the head to a vertical position.

These opposite movements of the tilting head, as well as the operation of the rams to move the platen have heretofore been accomplished by means of a hand operated valve.

In accordance with the present invention a combination of mechanical, fluid and electrical elements are provided to automatically open and close the mold.

Mechanism for accomplishing the said automatic operation includes certain operating elements which are presented in diagrammatic arrangement in Fig. 7.

These elements include the ram-valve RV which controls the admission of pressure fluid to or the release of pressure fluid from the cylinders containing the rams which lift the platen carrying the lower mold element.

The pipe 16 leading from one side of valve RV admits fluid to raise the lower mold element when the valve is set to pass fluid from pipe 40 which is in communication with the main pressure line 17. When the valve RV is set to release the pressure from the ram cylinders, the fluid in the cylinders and pipes 16 is by-passed through outlet pipe 41 to an exhaust line 42 which leads to an accumulator.

The return movement of the platen is effected as above set forth by means of pistons 18 under constant pressure supplied through pipes 20 in communication with pipe 17' which connects with the main pressure line 17.

The tilting-head cylinder 31 in which pistons operate to return the head to a vertical position is connected by pipe 33 to one side of the tilting head valve TV. The opposite side of the valve is connected with the main pressure line 17 through pipe 40 and an exhaust outlet pipe 45 is provided for discharge into pipe 42. The cylinder 32 is connected to the pressure line 17 by means of pipe 33' which is in communication with pipe 17'.

*Ram-valve operating mechanism*

The ram-valve RV is operated by means of a rack 46 in mesh with a pinion 47 on the stem of the said valve. The rack is mounted on the rod 46' of a piston 48 movable under fluid pressure, preferably air, in a cylinder 49. The movement of the piston 48 is controlled by a master-control-valve MRV, the opposite sides of which are provided with pipes 51 and 52 communicating with the opposite ends of the cylinder 49. The valve may be provided with a relief outlet 52'. Fluid under pressure enters the valve MRV through a pipe 53 connected to a fluid pressure line 54.

The valve MRV is operated by means of a lever-arm 55, to direct fluid to either side of the piston 48. One end of the lever is secured to the stem of the valve and the opposite end is provided with a slot 56 to receive a pin 57 on a double-acting armature 58. The armature is controlled by a duplex solenoid D comprising a pair of coils 61 and 62 so connected with an electrical circuit that when one coil 61 is energized, the armature 58 will move in one direction and when the other coil 62 is energized the armature will move in the opposite direction. By reason of this electrical actuation of the armature 58, the lever 55 will direct the flow of pressure fluid to reciprocate the piston 48 and thus operate the valve RV which in turn controls the operation of the rams which lift the platen and lower mold element 11.

*Tilting head valve operating mechanism*

The valve TV, which controls the tilting head, is controlled by a master-control-valve MTV which is operated electrically in the same manner as the valve MRV which operates the rams. As shown, the valve MTV operates a piston 63 in a cylinder 63'. The rod 64 of the piston is provided with a rack 65 in mesh with a pinion 66 on the stem of the valve TV. A movement of the rod 64 in one direction causes the valve TV to admit pressure fluid to cylinder 31 by closing the pipe 45 to the outlet 42 and permitting pressure fluid to pass into pipe 33. An opposite movement of the piston cuts off the flow of pressure fluid through pipe 40 and connects the pipe 33 to the pipe 45, which is in communication with pipe 42 leading to the outlet.

The piston 63 is operated by fluid, preferably air under pressure, which is lead to the valve MTV through pipe 67. One side of the valve connects with one side of the piston cylinder 63' through pipe 68 and the other side of the valve is connected with the other side of the cylinder through pipe 69 and an exhaust pipe 70 is provided.

The valve MTV is electrically actuated by means of a duplex solenoid E comprising coils 71 and 72 which operate an armature 73. The armature is provided with a pin 74 disposed in a slot at one end of a lever arm 75. The opposite end of the arm is secured to the stem of the valve MTV so that a movement of the armature, under the action of the solenoid operates the valve which in turn causes a movement of the rod 64 to actuate the valve TV to control the movement of the tilting head.

*Electrical control circuit*

The electrical circuit including the duplex solenoids D and E which operate the master-tilting-head valve MTV and the master ram control valve MRV is illustrated in diagram in Fig. 6. The armatures 58 and 73 of the solenoids D and E respectively are shown in the positions they take when the press is closed, with the mold elements in operative relation. The opening of the press is controlled by the action of timing mechanism.

As shown in the drawing, Fig. 6, a switch 80 may be provided to close or open a circuit including main conductors 81 and 82 which constitute a supply line through which electrical energy may be conducted from any suitable source (not shown). The valve MRV is controlled by the duplex solenoid D including the coils 61 and 62.

Conductor 81, which leads directly to the source of electrical energy, is connected with one end of coil 61. The other end of the coil is connected with conductor 82' which leads to a contact member 80' at one side of a time controlled switch embodied in a time clock F. The movable element of the switch may be considered as the pointer 86' of the clock, it being evident that the switch construction shown is diagrammatic. The other side of the pointer 86' is connected by conductor 84 to main conductor 82. One side of the coil 62 is connected by conductor 83 to conductor 84 which connects with conductor 82. The other end of the coil 62 is connected with conductor 86, switch K, to be later described, conductor 88, conductor 93 and conductor 95 which latter is connected with main conductor 81 leading from the line. When the switch including the pointer 86' and the contact 80' is closed, current is caused to flow through an indicator light 91' in parallel with conductors 81 and 82'.

The coil 61 is energized by a flow of current from the conductors 81 and 82 when the timing mechanism operates to close the circuit which is open when the pointer 86' is removed from the contact 80'. The timing mechanism F may be any standard form of timing clock. The clock mechanism may include a release button G which serves to release the pointer 86' for travel to position for a timing operation. The clock circuit may include conductors 92 and 93. The conductor 93 leads directly to main conductor 82 and the conductor 92 leads to a switch H and to main conductor 81. The purpose and operation of this switch will be later described.

The clock F may have a pointer S (Fig. 1) to set the time period that the clock is to run, which determines the movement of the pointer 86' clockwise to set position. When current is caused to flow in the clock operating circuit the pointer 86' moves counter-clockwise from set position until it reaches the zero point or contact 80'. The pointer 86' is moved toward the zero point in opposition to a spring and when it reaches the zero point it is held by a latch which is released when the member G is operated to release the pointer for a timing movement. The pointer 86' may be set for any given time by moving the setting pointer S to the proper position and when the release member G is actuated the pointer will travel to the position set by the setting pointer.

The clock mechanism is well known but in the present construction a starting switch or push button I and a stop switch or push button J are provided as part of the present improved press control mechanism. The starting switch may be so constructed that a movement thereof will operate the release member G. The stop switch J is provided for the purpose of reversing the operation of the press and is arranged to normally close the circuit to permit the flow of current for the various operating elements but open the normal operating circuit and close a circuit including conductor 90 which connects with the main conductor 82 and conductor 90' which connects with conductor 82' and coil 61.

The master-tilting-head-valve MTV is controlled by coils 71 and 72 of the solenoid E. One end of coil 71 is connected to conductor 96 which connects, through switches I and J, with conductor 97 which latter is connected to main conductor 82. The other end of coil 71 is connected by conductor 98 and conductor 95 to main conductor 81. One end of coil 72 is connected by conductor 99 through switch L to main conductor 81. The other end of the coil 72 is connected by conductor 101 to conductor 82', which connects with contact member 80' of the clock F, the pointer being connected by conductor 84 with the main conductor 82.

The valves MRV and MTV are thus controlled by their respective duplex solenoids which are energized by the electrical circuits above described. The switches K, H and L are important in connection with the automatic control. The switch K, as shown in detail in Fig. 3, is mounted on the projection 26 on the tilting-head and includes contact element 105 and 106 contained in a housing 107. Contact 106 connects with conductor 86 and the other contact with conductor 88. The contact 105 is provided with a latch piece 108 and is arranged to be flexed when engaged by a latch operating member 109 to bring the contacts into engagement for a flow of current. It is only necessary to provide a momentary flow of current so that as the member 109 passes the latch piece the contact is made.

The latch piece is carried on a slide rod 110 which is part of the shock-absorber member 26' and when the head is tilted the rod is projected as shown in dotted lines in Fig. 2. The rod 110 is utilized in the present invention to operate the switch K because it happens to answer the requirements for a member movable relative to the head 24 but it is obvious that other suitable means may be employed.

The member 109 is pivoted at 111 at one end of an arm 112 secured to the rod 110. The free end of the member 109 is so disposed as to engage the latch piece but when the rod moves upwardly the member 109 rocks on its pivot and does not move the latch piece and the contact elements do not engage. When the rod returns and the head is in its vertical position the member 109 is held from rocking in an opposite direction by reason of an extension 113 which engages the arm 112 so that in order to pass the latch piece 108 the member 109 operates to engage the contacts 105 and 106. The extension 113 serves as a counterweight to bring the member 109 to a normal position after each operation.

A guide pin 114 is disposed in a slot in the extension to limit the movement of the arm. It is important that the switch K does not operate until the head is in its vertical position since a flow of current caused by the switch K results in a movement of the bottom mold element which must not take place until the tilting-head is in its final vertical position. As an insurance against any untimely operation of the switch K, a mercury switch K' is provided in series with the switch K.

The mercury switch is supported on an adjustable bracket 115 on the head 24 and may be so positioned that current will only flow when the switch is in a definite position relative to the position of the head. By reason of the switch K' therefore, no current will flow through the circuit for operating the rams which move the bottom mold element until the tilting head is in its proper position to receive said element. It will be evident that switch K also operates to keep the ram operating circuit open.

The switch mechanism L is operated by a downward movement of the platen and serves to cause a flow of current to move the tilting-head from a vertical to a tilted position. The switch proper is of the mercury contact type and may comprise a glass envelope 120 having electrodes 121 and 122 arranged to be electrically connected by a mercury pool when the switch is tilted from a horizontal to an inclined position.

Conductor 81 is connected with one electrode and conductor 99 is connected with the other. When the switch is in a horizontal position the mercury body remains out of contact with one of the electrodes. The switch is, however, mounted on a bracket 124 pivoted at 125. An arm 126 extends from the bracket and a counter weight 127 holds the switch normally horizontal.

An operation of the switch is effected by a tipping finger 128 mounted on the cross piece 21 of the platen and so arranged that when the platen moves to its lowermost position the finger 128 engages the switch and tips it causing a flow of electrical energy through the circuit which causes the head to move to a tilted or open position. The finger is pivoted and arranged with a stop to limit the movement of the finger sufficiently to actuate the switch L upon a downward movement of the platen. When the platen returns or moves upwardly, however, the finger rocks about its pivot to pass the arm 126 of the switch.

*Operation*

Assuming that the tilting head 24, carrying the upper mold element, and the platen 10, carrying the lower mold element, are in molding position and the timing pointer 86' of the clock F is moving counter-clockwise toward the contact 80'. When the pointer reaches contact 80', electrical energy will flow from the source of supply comprising the conductor 82, through conductor 84, conductor 82', coil 61, thence through conductor 81 and to the other side of the source of electrical energy supply.

The coil 61 being thus energized, the armature 58 will move so that the lever 55 on the valve MRV will operate to permit air under pressure to flow through pipe 51 to move the piston 48 and thus operate the rack 46 to rotate the pinion 47 of the ram valve RV. This operation of the pinion 47 opens the pipe 16, leading to the ram valve to exhaust pipe 41 permitting the fluid under pressure in the ram cylinder to escape to the accumulator or exhaust.

The constant pressure in the pull-down cylinders 19 causes the platen 10 carrying the lower mold element to descend and the cross bar 21, which moves downwardly with the platen, causes the finger 128 to engage member 126 causing the mercury switch L to operate, permitting a momentary flow of current through conductor 99, coil 72, conductor 101, conductor 82' through closed switch on the clock, conductor 84 and thence to conductor 82 or one side of the electrical energy supply. The other side of the source of electrical energy is connected by conductor 81 with the other side of the mercury switch L. The coil 72 being thus energized causes a movement of the armature 73 which in turn moves the lever 75 operating the valve MTV causing fluid pressure to enter the cylinder 63' and move the piston 63. This movement of the piston operates the stem 64 which rotates the pinion 66 on the stem of the valve TV.

The valve TV then operates to open the pipe 33 to the exhaust or accumulator through pipe 42 releasing the pressure in the cylinder 31 which operates to hold the tilting head in a vertical position and the constant pressure applied in cylinder 32 of the tilting head causes the same to move to its angular or open position. The molded material may then be removed from the mold and the mold cleaned and supplied with a new batch of moldable material, ready for another molding operation.

It will be noted that, when the press is opened, the platen which is operated by the hydraulic rams is first lowered and then the head is tilted backwardly. When the press is to be closed, however, it is necessary to first move the tilting head to its vertical position and then operate the rams to close or move the platen to bring the mold elements into their operative molding position.

In order to start the mold closing operation for the purpose of putting into operation the various co-related elements which operate to close the mold, hold it closed for a definite time period and then open the mold, it is only necessary to press the push button or starting switch I. This switch operates the release member G and sets the clock, and is only closed momentarily causing current to flow through conductor 96, the coil 71, conductor 98 and main conductor 81 connected with the source of electrical energy supply. The other side of the switch is connected with main conductor 82 of said energy supply by means of conductor 97 and closed switch J. It will be evident, however, since switch H is open by reason of the down position of the platen that no current will be flowing in the clock circuit.

An energization of the coil 71 causes the armature 73 to move into the coil, thus actuating the lever 75 to operate the valve MTV and cause a flow of pressure fluid through the pipe 68 to move the piston 63 and operate the valve TV for the passage of pressure fluid through pipe 33 into the cylinder 31 of the tilting head.

As the tilting-head reaches its final position and is ready to have the platen moved upwardly to bring the mold elements into operative molding relation, the switch K operates to cause a flow of electrical energy through conductor 86, coil 62, conductor 83, conductor 97 and main conductor 82 leading from the source of electrical energy supply. The other side or main conductor 81 of the electrical energy supply is connected with the switch K by means of conductor 88 and conductor 93. When the coil 62 is energized the armature 58 is moved to operate the lever 55 and permit a flow of pressure fluid through pipe 52 to move the piston 48, thereby operating the valve RV which opens the pipe 16 to the pressure ram and fluid under pressure is admitted to the ram cylinders causing them to raise the platen and bring the mold elements into operative molding relation.

As the mold elements come into operative position the switch H closes the circuit 81, 92, 93, 82 which permits a flow of electrical energy to operate the timing mechanism. The mold elements will be held in this position until the pointer 86' moves to engage with contact 80' at which time current will flow to operate the solenoid controlling the valve MRV to lower the platen, the operation of which causes current to flow through the solenoid which operates the valve MTV to tilt the head backwardly.

When the press is open the hand switch or button I is actuated and sets the timing clock ready to operate for a given time period. The switch, however, does not start the clock but sets the clock circuit ready for a flow of current and causes a flow of electrical energy in a circuit which operates mechanism to bring the tilting head to a vertical position. As the tilting head reaches this position, it cooperates with the switch which causes a flow of current in another circuit whereby the lower mold element is caused to rise to its operative position with relation to the upper mold element in the tilting-head. As the lower mold element reaches its final position, it cooperates with the switch which causes a flow of electrical energy through the time clock thus causing the same to operate for a set time period. The switch or button J may be operated in an emergency to close the circuit 81, 61, 82', 80', 90, 97, 82, causing the press to be opened.

At the termination of this time period, assuming no operation of the stop switch J, the clock mechanism operates to cause a flow of electrical energy thru the circuit which operates means to lower the lower mold element, operating the switch which breaks the circuit through the time clock and as the lower mold element reaches its final position it cooperates with the switch which causes an operation of the means to move the head carrying the upper mold element to a tilted position, the press is then open and again ready to have the molded articles removed and a new batch of moldable material supplied. The various cooperating switch elements which cause current flow to effect the movement of the co-related machine parts operate to produce temporary flows of electrical energy for each separate operation.

It will be evident that with the present construction a press is provided which may be operated to close and open after once having been put into operation by an attendant.

Although a preferred embodiment of the invention is shown and described herein, it is to be understood that modifications may be made therein without departing from the spirit and scope of the invention as set forth in the appended claims.

What is claimed is:

1. A molding press having a lower mold element movable in a vertical path, an upper mold element movable in an arcuate path to an open position, a ram for raising said lower element, means for lowering said lower element, a piston for moving said upper element to a closed position, means for causing said piston to return said upper element to an open position, fluid pressure lines, a ram control valve in one line, a piston control valve in another said line, a circuit including electrically operable means for actuating said valves, means for causing a flow of electrical energy to operate said piston control valve to cause said piston to move said upper element to a closed position, means carried by and operable upon a predetermined movement of said upper element to cause electrical energy to flow in said circuit to operate said ram control valve and raise said lower element, means in said circuit operable after a set time interval for causing a flow of electrical energy in said circuit for operating said ram valve to remove the pressure on said ram for the operation of said first mentioned means to lower said lower element, means operable upon a movement of said lower element to cause a flow of electrical energy in said circuit to operate said piston control valve to release the pressure on one side of said piston for the operation of said second mentioned means to return the upper element to an open position.

2. A molding press having a vertically reciprocal lower molding head and an oscillatory upper molding head, a ram for said lower head, a piston for said upper head, pressure lines for operating said ram and piston to hold said heads in closed molding relation, a lower head valve in one line for controlling the flow of pressure fluid to said ram, an upper head valve in another line for controlling the flow of pressure fluid to said piston, an electrical circuit including a solenoid for operating said lower head valve and a solenoid for operating said upper head valve, means for causing a flow of current in said circuit to operate said first mentioned solenoid to lower said lower head, and means operable upon a movement of said lower head for causing a flow of current to actuate said second mentioned solenoid to move said upper head.

3. A molding press having a vertically reciprocal lower molding head, an upper oscillatory molding head, a ram for operating said lower head, a piston for operating said upper head, lines for supplying fluid pressure to said ram and piston, a ram control valve in one line, a piston control valve in another line, electrical circuits, a piston control solenoid in one circuit, a ram control solenoid in another circuit, means for causing a flow of current to operate said piston control valve solenoid to move its valve to cause a movement of said upper head to a closed position, means operable upon a predetermined movement of said upper head to cause a flow of current to operate said ram control valve solenoid to move its valve to cause a movement of said lower head to a closed position, means in said circuit operable after a set time interval for actuating said valves to release the pressure on said ram and piston, and means for moving said heads to open positions.

4. A press comprising a vertically movable bottom mold element adapted to be raised by hydraulic ram means to meet a hydraulic-engine-operated top mold element, a master ram valve controlling the flow of fluid to the bottom element ram means, solenoids for controlling the operation of said master ram valve, a master top-mold valve controlling the flow of fluid to the top element engine, solenoids for controlling the operation of said master top element valve, upper and lower contact devices for said bottom element, a contact device for said top element, a time clock with setting and time-control elements, circuits connecting said clock with said solenoids and contact devices, and a starting switch which when closed causes the time control element to move to a position, predetermined by the setting element, and one of the master top element valve solenoids to operate, causing the top element to be moved from a tilted to a vertical position and close its contact device, to effect actuation of a solenoid for the master ram valve, to cause operation of the hydraulic ram means to raise the bottom element into compressing relation with the top element, thereby closing the upper contact device for said bottom element and starting the return movement of said timing element to initial position, to then close a circuit and energize the other solenoid of said master ram valve to cause a lowering of said bottom element, said lowering operation effecting the closure of the bottom element lower contact device to energize the other solenoid of said master top element valve, causing a return movement of said top mold to tilted position.

5. A press comprising a vertically movable bottom mold element raised by hydraulic ram means to meet a hydraulic-engine-operated top mold element, a master ram valve controlling the flow of fluid to the bottom element ram means, solenoids for controlling the operation of said master ram valve, a master top element valve controlling the flow of fluid to the top element engine, solenoids for controlling the operation of said master top element valve, contact devices for said bottom and top elements, a time clock with setting and time-control elements, circuits connecting said clock with said solenoids and contact device, starting means which when closed causes the time control element to move to a predetermined position, and one of the master top element valve solenoids to operate, causing the top element to be moved from a tilted to a vertical position and close its contact device, to effect actuation of a solenoid for the master ram valve, to cause operation of the hydraulic ram means to raise the bottom element into compressing relation with the top element, thereby closing a contact device for said bottom element and starting the return movement of said time element to initial position, and stopping means which when closed energizes the other solenoid for the master ram valve to cause a lowering of said bottom element, said lowering operation effecting the closure of the other bottom contact device to energize the other solenoid of said master top element valve, causing a return movement of said top element to tilted position.

6. A press comprising a vertically movable bottom mold element, a top mold element swingable to and from operative position directly above said bottom mold element, means for swinging said top mold element, means initiated solely by the swinging of said top mold element from inoperative to operative position above said bottom mold element for moving the latter upwardly into engagement with said top mold element, means for selectively timing the period of engagement between said mold elements, and means acting at the termination of a selected interval of time to cause said bottom mold element to be automatically lowered and the top mold element again swung to inoperative position.

7. A press comprising a vertically movable bottom mold element, a top mold element swingable to and from operative position directly above said bottom mold element, hydraulic ram means for operating said bottom mold element, hydraulic engine means for operating said top mold element, a master ram valve controlling the flow of fluid to said ram means, raising and lowering solenoids for controlling the operation of said master ram valve, a master top element valve controlling the flow of fluid to the top element engine, closing and opening solenoids for controlling the operation of said master top element valve, contact devices on said bottom and top mold elements for respectively controlling the operation of a top valve solenoid and a bottom valve solenoid, a timing device with setting and time-control elements, another contact device on said bottom mold element for starting the time-control element, circuits connecting said time control element with the lowering solenoid of the master ram valve and last-mentioned contact device, and a starting switch which, when closed, causes the time control element to move a predetermined distance and the closing master top element valve solenoid to operate and cause the top mold element to be moved from a tilted to a vertical position directly above said bottom mold element, and the movement of said top mold element to cause its contact device to be closed to actuate the raising master ram valve solenoid to cause the operation of the hydraulic ram means and the raising of the bottom mold element into compressing relation with the top mold element, thereby closing said bottom mold element time control contact device and starting the return movement of said time-control element to initial position when it energizes the lowering master ram valve solenoid to cause the hydraulic ram means to lower the bottom mold element, which lowering movement closes the top valve solenoid contact device and energizes the opening master top element valve solenoid to cause the hydraulic engine to return the top mold element to inoperative position.

8. A molding press having an oscillatory upper molding head, a vertically reciprocable lower molding head, a piston for said upper head, a ram for said lower head, pressure lines for operating said piston and ram to move said heads between open and molding relations, an upper head valve in a line for controlling the flow of pressure fluid to said piston, a lower head valve in another line for controlling the flow of pressure fluid to said ram, a pressure actuated member for operating said first named valve, a pressure actuated member for operating said second named valve, a double-acting solenoid and electrical circuit for controlling said first named pressure member, a double-acting solenoid and electrical circuit for controlling said second named pressure member, means for energizing one of said circuits to operate its solenoid and cause a movement of a pressure-actuated member to operate its valve and move one of said mold elements, and means operated upon such movement of said mold element to energize the other circuit to operate its solenoid and cause a movement of the other pressure-actuated member to operate its valve and move the other mold element.

9. A molding press having a vertically reciprocable lower molding head, an upper oscillatory molding head, a ram for operating said lower head, a piston for operating said upper head, lines for supplying fluid pressure to said ram and piston, a ram control valve in one line, a piston control valve in another line, electrical circuits, a piston control solenoid in one circuit, a ram control solenoid in another circuit, a time clock, with setting and time control elements, connected for controlling said solenoids, a starting switch which, when closed, results in the time control element moving to a position, predetermined by the setting element, to cause, first, the piston control solenoid to act and make the upper head move to operative position, then the ram control solenoid to act and make the lower molding head move into compressing relation therewith and remain in such position during a time predetermined in accordance with the setting of said clock, and then said ram and piston control solenoids to move in sequence to their initial positions, making said lower head return to its initial position followed by a return of the upper head to initial position.

10. A molding press having a vertically reciprocable lower molding head, an oscillatory upper molding head, a ram for said lower head, a piston for said upper head, pressure lines for operating said ram and piston to move said heads between open and molding relations, a lower head valve in one line for controlling the flow of pressure fluid to said ram, an upper head valve in another line for controlling the flow of pressure fluid to said piston, an electrical circuit including a solenoid for operating said lower head valve, an electrical circuit including a solenoid for operating said upper head valve, starting means for causing energization of the upper head valve solenoid to move said upper head, and means operable upon a movement of said upper head for energizing said lower head valve solenoid to move said lower head.

WILLIAM MAKENNY.
WILLIAM HARRISON.